*INVENTOR.*
WALTER J. ALBERSHEIM
*BY* Kenway, Jenney, Witter & Hildreth
ATTORNEYS INVENTOR.
WALTER J. ALBERSHEIM
BY Kenway, Jenney, Witter & Hildreth
ATTORNEYS INVENTOR.
WALTER J. ALBERSHEIM
BY Kenway, Jenney, Witter & Hildreth
ATTORNEYS United States Patent Office 3,173,110
Patented Mar. 9, 1965

3,173,110

TEMPERATURE COMPENSATING DEVICE HAVING A THERMISTOR IN THE GRID-TO-CATHODE BIASING CIRCUIT OF THE AMPLIFIER

Walter J. Albersheim, Waban, Mass., assignor to Spencer-Kennedy Laboratories, Inc., Boston, Mass., a corporation of Massachusetts Filed Mar. 15, 1960, Ser. No. 15,213
3 Claims. (Cl. 333—18)

The present invention relates to high frequency transmission systems and more particularly to improvements in transmission systems having transmission lines of such length that the changes in transmission characteristics resulting from variations in temperature are such as to interfere with the proper operation of the system.

In high frequency transmission systems employing long transmission lines and associated amplifying equipment, substantial variations in the transmission line characteristics with temperature are caused by the variation in resistance. Copper has a temperature coefficient of 0.00393 per degree centigrade, resulting in a change of about 20 percent in resistance between the summer and winter temperatures that are typical for the northeastern United States. Such seasonal temperature changes adversely affect performance; not only is the over-all gain changed but also the relative gain over the operating range of frequencies is apt to depart considerably from the designed characteristic. This is due to the fact that the effective high frequency loss of cables is proportional to the square root of the product of resistivity and frequency, hence the loss variations with temperature become more severe at the higher frequencies and in a wide band system may cause serious unbalance in the transmission characteristic over the band being transmitted.

It is therefore an object of the present invention to provide a system and apparatus of relatively simple construction and operation which will provide effective control of the gain of a transmission system with respect to changes in the ambient temperature.

More particularly, it is an object of the invention to provide a system and apparatus which makes possible the effective control of gain of a wide band transmission system having relatively long transmission lines, so that both the over-all gain and the relative gain over the full width of the transmission band may be stabilized to render the transmission characteristics substantially independent of seasonal and diurnal variations in temperature.

In accordance with the objects of the present invention, a high frequency transmission system is provided in which the characteristics of the amplifying means or other circuit elements associated with the transmission line may be modified under the direct control of temperature sensitive means responsive to ambient temperature in the vicinity of the transmission line, to provide the desired over-all transmission characteristic substantially unaffected by temperature changes.

In the accompanying drawings, FIG. 1 is a schematic diagram of a simplified form of temperature controlled amplifier illustrative of the manner of achieving effective temperature compensation in accordance with the invention.

Figure 1:
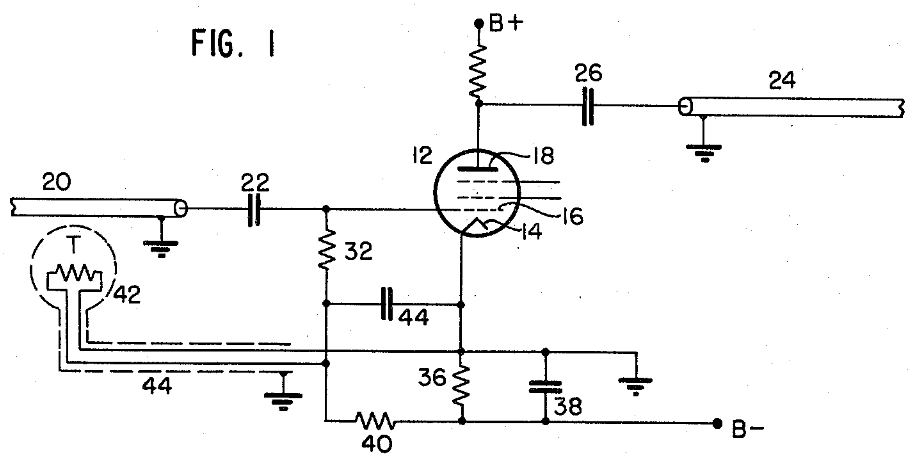

Referring to FIG. 1 which shows a simplified form of compensated amplifier stage for moderate band-width systems, vacuum tube 12 may be a conventional R.F. amplifier tube of the remote cut-off type. Only the cathode 14, control grid 16, and anode 18 are specifically referred to, it being understood that the screen and suppressor grids may be connected as is usual with R.F. pentodes.

The signal input to the amplifier stage is provided through transmission line 20, customarily of the coaxial type, through grid blocking capacitor 22, while the output is coupled to transmission line 24 through D.C. isolating capacitor 26. The transmission line 20 or the line 24, or both, may be of such length as to be materially influenced by temperature changes, such as seasonal variations from summer to winter, or diurnal variations which of themselves may be substantial and of appreciable effect on the cable resistance.

The grid return, via grid resistor 32, is arranged to receive a varying grid bias voltage as a function of the temperature of the general environment of the transmission line or lines 20, 24. A static or reference bias, sufficient to reduce appreciably the stage gain, is developed across bias resistor 36 by returning the negative side of the anode supply to ground through this resistor. By way of example, the static negative voltage developed across the bias resistor may be of the order of 5 to 10 volts. A by-pass capacitor 38 of suitably low impedance in the operating frequency range shunts the bias resistor.

To control the amplifier gain as a function of temperature at or near the transmission line, a temperature sensitive voltage divider is provided between the bias resistor and the grid return. This divider comprises fixed resistor 40, much higher in resistance than bias resistor 36, and a temperature sensitive resistor or thermistor 42. The thermistor exhibits a negative temperature coefficient of resistance such that, by way of example, the resistance may be of the order of 300,000 ohms in cold winter weather and of the order of 30,000 ohms on hot summer days. The thermistor is preferably mounted in the general vicinity of the long transmission line or cable whose varying characteristics are to be compensated. In the illustrated embodiment, the thermistor is shown adjacent the line 20 whose output is connected to the amplifier, but the thermistor might as an alternative be associated with the line 24 from the output of the amplifier, if that transmission line is of substantial length and subject to different temperature conditions. In general, however, the thermistor, if disposed anywhere in the general vicinity of either cable, will respond suitably to the ambient temperature. To provide weather protection and to minimize undesired pick-up, the thermistor is preferably mounted within a protective shield and the line 44 from the thermistor to the bias and grid circuits likewise shielded and the shield grounded, as shown.

The operation of the variable gain amplifier of FIG. 1 is essentially as follows. In hot weather, when the loss in the transmission line increases due to an increase in the resistance of the conductor, the resistance of the temperature sensitive element 42 drops. In other words, the thermistor varies in resistance inversely with the ambient temperature rather than directly as is the case with the transmission line. The lower resistance of the thermistor decreases the magnitude of the biasing voltage which is applied to the lower end of grid resistor 32, through varying the ratio of the voltage divider formed by the thermistor and fixed resistor 40. Thus, in hot weather, a lower value of grid bias is applied to the amplifier tube and the gain of the amplifier thus is greater. This increase in amplifier gain counteracts the increased loss in the transmission line. In cold weather the operation is exactly opposite; the thermistor resistance rises, which increases the bias applied to the control grid of amplified tube 30 and thus decreases the over-all gain of the variable gain amplifier. The decreased amplifier gain counteracts the decreased loss due to lower resistance of the conductors in the transmission line.

By suitable choice of thermistor and fixed resistance values in the voltage divider bias circuit, the change of bias with temperature may be tailored to the amplification of the tube so that over the range of temperatures encountered, the gain of the stage will vary with temperature in an amount substantially equal but in opposite sense to the variation in transmission loss of the line to produce a substantially uniform over-all transmission characteristic free of diurnal and seasonal fluctuations.

Figure 2:
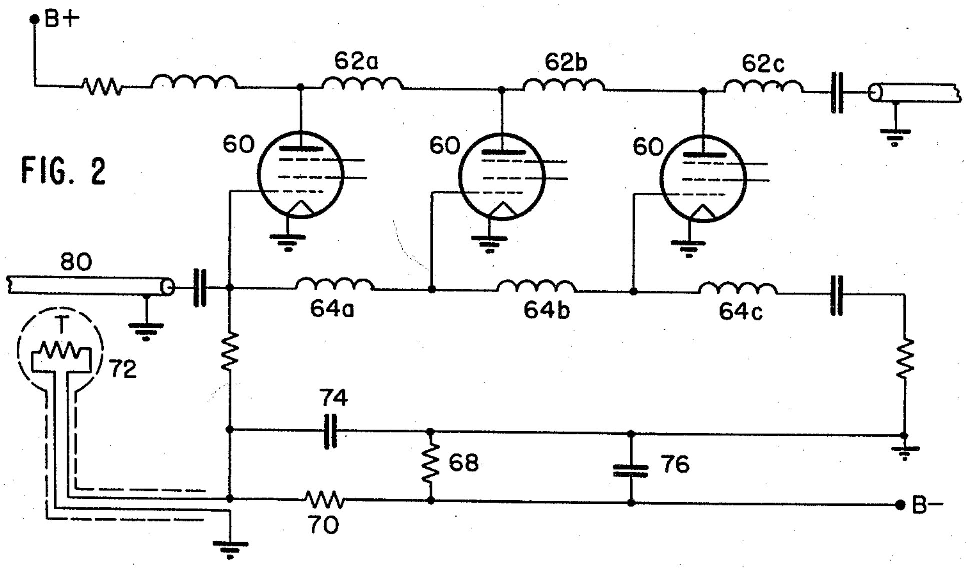
FIG. 2 is a showing in simplified schematic fashion of a wide-band amplifier having temperature control of its gain and suitable for use in a transmission system intended to pass a wide band of frequencies.

For systems such as television distribution systems in which the band width of a simple amplifier having one or more stages of the type shown in FIG. 1 would be inadequate, a wide-band amplifier such as the distributed amplifier illustrated substantially in FIG. 2 may be employed. Such an amplifier makes use of a plurality of tubes 60 having their anodes and cathodes connected at spaced intervals to transmission-line type anode inductances *62a*, *62b*, *62c* and grid inductances *64a*, *64b*, *64c*. Only three tubes are illustrated for simplicity; amplifiers employing a larger number of tubes disposed at spaced points along the grid and anode inductances may be utilized where needed to meet the band width requirements.

The variable bias circuit for controlling the grid bias with variations in ambient temperature may be substantially that shown in FIG. 1. A bias voltage is developed by the flow of anode current returning to ground through resistor 68. The D.C. voltage applied to the grids is derived from the voltage divider made up of fixed resistor 70 and thermistor 72 with by-pass capacitors 74 and 76, the thermistor being exposed to the same general temperature conditions as the transmission line 80 to which the amplifier is connected. An increase in ambient temperature thus serves to decrease the thermistor resistance and diminish the grid bias on all tubes, thereby increasing the gain or amplification to compensate for the greater loss in the transmission line or coaxial cable at the higher operating temperatures. Conversely, at low ambient temperatures the thermistor resistance increases to allow a larger proportion of the drop across resistor 68 to be applied to all control grids, thereby biasing the tubes onto a lower-gain portion of their operating characteristics to compensate very closely for the lower losses in the transmission line when cold.

Thermal gain control of the type provided by the bias controlled amplifiers shown in FIGS. 1 and 2 is effective to provide automatic compensation for the average loss variations in the transmission lines caused by diurnal and seasonal variations in temperature. If, however, the system is required to handle a relatively wide range of frequencies, such as a range of 4:1 as may be required of a television distribution system, additional compensation for the effects of temperature may be necessary.

By way of example, a wide band TV distribution system may involve a frequency range from 50 to 200 megacycles. For low temperatures prevalent in the winter, the line loss might be 10 db at 50 megacycles and 20 db at 200 megacycles; this 10 db differential may be compensated by fixed gain equalizers. In summer, however, the loss in the transmission line is increased by 20%, to 12 db at 50 megacycles and to 24 db at 200 megacycles. Accordingly, even though the 2 db loss at 50 megacycles due to the higher temperature is compensated by an automatic gain control, there still remains a residual loss, hereinafter termed droop or tilt, of 2 db at the 200 megacycle edge of the band.

Figure 3:
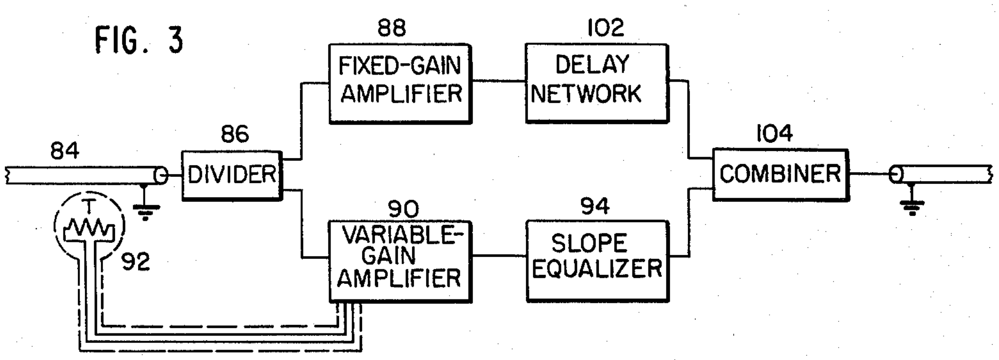
FIG. 3 is a block diagram showing a wide-band transmission system employing two channels, one of which is temperature-compensated in accordance with the invention so that variations in temperature of the transmission cable will not affect the relative system gain as a function of frequency.

A transmission system which makes possible the automatic attainment of a uniform relative gain characteristic over the full band width of a wide band transmission system, substantially unaffected by temperature, is illustrated in schematic block diagram in FIGURE 3. This system is characterized by the use of two amplifying channels for the signal, one channel having special compensating means and the other channel having conventional amplification.

As illustrated, the signal from the transmission line 84 is divided by a matched dividing network 86 into two channels. Such a network is well known and need not be described. One channel, termed the first channel and shown in the figure as the upper channel includes amplifier 88, which may be termed a normal amplifier, exhibiting relatively uniform gain over the operating frequency range and without temperature compensation for its gain. Such amplifier may advantageously be of the distributed type.

Figure 7:
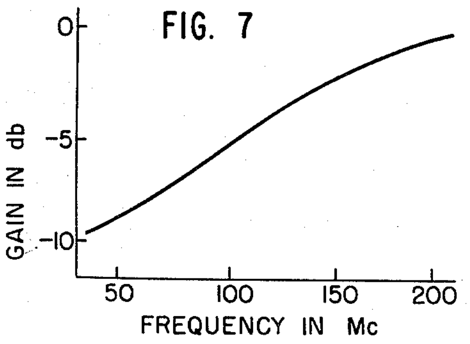
FIG. 7 is a plot showing a typical response characteristic of an equalizer having a fixed slope.

The other channel, termed the second channel, includes a second amplifier 90 that is basically of a similar type, but having its bias voltage, and therefore its gain, under the control of temperature sensitive means comprising a thermistor 92 responsive to the same general temperature conditions as the transmission line, as previously described in conjunction with the FIGURE 2 embodiment. Associated with the amplifier 90 is an equalizer 94 having a sloping loss/frequency characteristic such that the response characteristic of the second channel, taking the amplifier and equalizer together, rises with frequency, as shown in the typical curve of FIG. 7. It will be observed that the equalizer introduces approximately 10 db of loss at 50 megacycles, with the insertion loss decreasing substantially to zero at 200 megacycles, the upper end of the band referred to.

To optimize the phase relations in combining the outputs of the two channels, it is generally advantageous to include a delay equalizer 102 in the uncompensated first channel, before the signals are combined in the combining network 104 at the output. Such equalizer may employ a suitable length of transmission line, or may consist of lumped reactive elements such as series inductance and shunt capacitance, in accordance with conventional practice, thereby to produce a delay characteristic of the desired magnitude.

Figure 4:
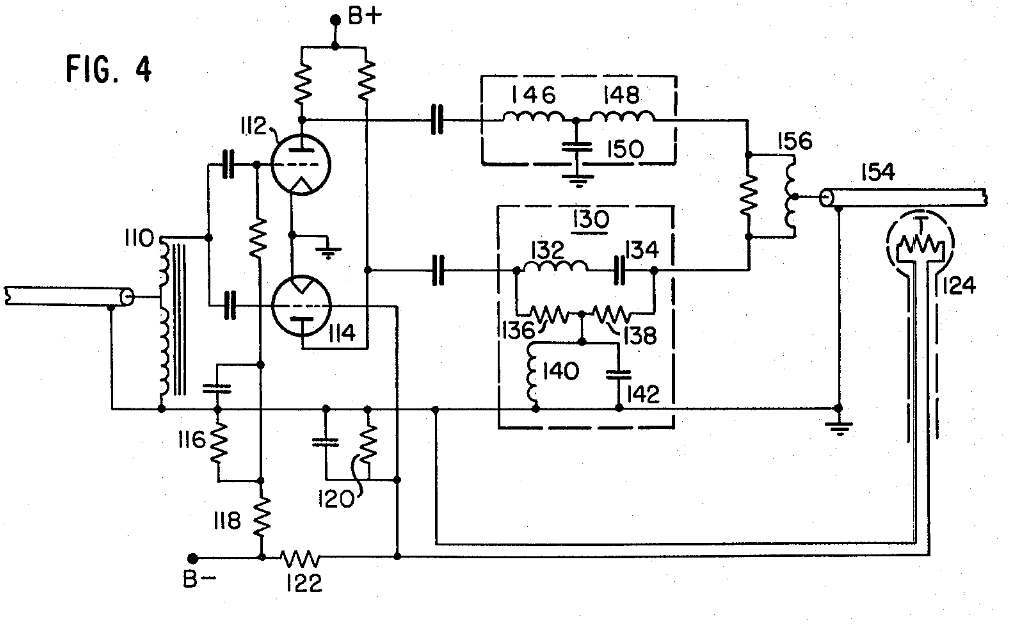
FIG. 4 is a schematic diagram of a representative embodiment of bi-channel amplifier.

To illustrate more specifically a representative bi-channel compensation system for both gain and tilt compensation, reference may be had to the schematic diagram of FIG. 4. In this embodiment, the transmission line input, at 75 ohms nominal impedance, is matched by transformer 110 to the resulting 150 ohm impedance of the paralleled inputs of first and second distributed amplifiers represented, for the purposes of the diagram, by vacuum tubes 112 and 114. The amplifier 112 of the first channel is uncompensated in gain and frequency and derives its fixed bias voltage from voltage divider 116, 118. The amplifier 114 of the second channel is compensated, as to its basic gain, by the temperature-controlled bias circuit composed of fixed resistors 120 and 122 and temperature-sensitive thermistor 124 having a negative temperature/resistance characteristic.

The output circuit of the compensated amplifier 114 of the second channel includes a slope equalizer indicated generally at 130 and comprising, for purposes of illustration only, series-connected inductance 132 and capacitance 134 shunted by resistances 136 and 138, and with a shunt LC circuit composed of inductance 140 and capacitance 142. A rising characteristic as a function of frequency of approximately 5 db per octave over the range 50–200 megacylces, is provided with the following values.

| | |
|---|---|
| Inductance **132** | 0.17 μh. |
| Capacitance **134** | 6.7 μμf. |
| Resistances **136, 138** | 200 ohms each. |
| Inductance **140** | 0.6 μh. |
| Capacitance **142** | 1.9 μμf. |

A time delay in the first channel, to insure proper phase combining of the outputs of the two channels, is achieved by a delay network comprising series inductances 146 and 148 and shunt capacitance 150; alternatively a suitable length of transmission line could be used. The signals from the delay network in channel 1 and from the slope equalizer in channel 2 are advantageously combined, and the system impedance matched to the output line 154, by hybrid transformer 156, though other forms of combining and matching networks may be employed.

In the operation of the bi-channel compensation system, under cold weather conditions the thermistor 124 in control of amplifier 114 is close to its maximum resistance, resulting in the application of the relatively high static reference bias to the grids of amplifier 114 in the second channel and thereby appreciably reducing its gain relative to that of amplifier 112 in channel 1. As a consequence, the rising characteristic of equalizer 130 is of little significance in the combined output.

Upon an increase in ambient temperature, the cable loss becomes greater, and proportionately greater at the high frequency end of the band. At the same time thermistor 124 decreases in resistance thereby modifying the voltage divider ratio in the bias circuit of amplifier 114 in a direction to increase the gain of said amplifier. With the resulting increased gain, plus the effect of the rising frequency characteristic of equalizer 130, channel 2 becomes the significant factor in the combined output to provide not only a compensated over-all gain but also an increasingly higher proportionate gain at the high frequency end, to compensate for the greater relative cable loss at the high frequency end at high ambient temperatures. Thus the relative contribution of the two channels, with their dissimilar gain/frequency characteristics, is caused to be a function of temperature, so that the change in transmission line characteristics with temperature may be accurately and automatically offset or compensated for by an equal but opposite change in the gain and frequency characteristics of the bi-channel amplifier system.

Figure 5:
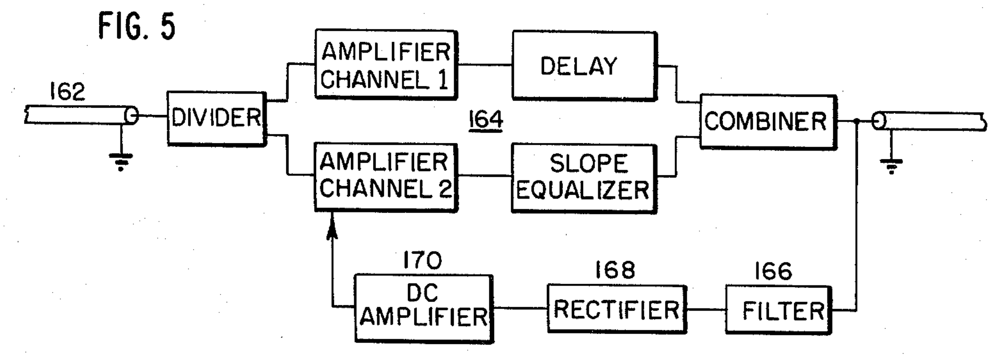
FIG. 5 is a block diagram illustrating an alternative embodiment of the bi-channel system of the invention.

The advantages provided by the bi-channel amplifier system in achieving both gain and tilt compensation may be obtained with other forms of control of amplifier gain. By way of example, as illustrated schematically in FIG. 5, a pilot signal may be transmitted over the transmission line 162, together with the main communication signal or signals. This pilot signal, which may be a separate single-frequency signal or the carrier of a message channel, is removed from the output of the bi-channel amplifier 164 by filter 166, rectified at 168, and amplified by D.C. amplifier 170 to provide a D.C. voltage for controlling the bias and therefore the gain of the variable gain channel. Variations in the pilot signal due to changes in cable loss thus bring about a gain adjustment in the second channel containing the slope equalizer, so as to cause the combined output of the system to be substantially uniform over the entire frequency range of the system, unaffected by changes in cable loss due to temperature effects.

Figure 6:
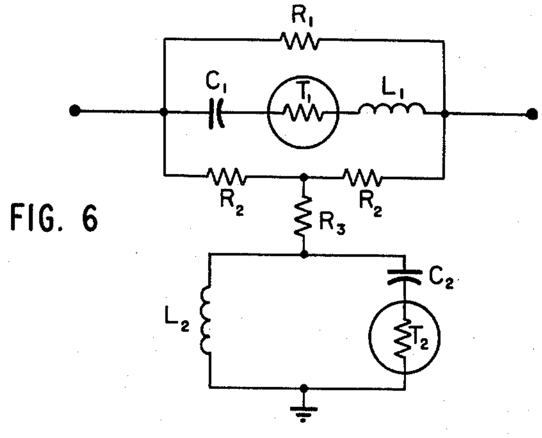
FIG. 6 is a schematic diagram of a passive form of temperature responsive slope equalizer.

Still another mode of achieving a desirably uniform gain/frequency characteristic in a wide band system having long transmission lines, independent of changes in temperature, is through the use of passive equalizer means incorporating, within the equalizer network, temperature responsive means for modifying the network characteristics. A representative embodiment of such a passive, thermally variable equalizer is illustrated in FIG. 6, which shows a slope equalizer of the constant resistance type. The values of inductances $L_1$ and $L_2$, capacitances $C_1$ and $C_2$, and fixed resistors $R_1$, $R_2$ and $R_3$ may be the same as in conventional fixed-tilt slope equalizers exhibiting constant resistance properties.

The loss and tilt characteristics of the equalizer are made variable as a function of temperature through the provision of two thermistors $T_1$ and $T_2$, the thermistor $T_1$ being included in the series circuit with $L_1C_1$ and the thermistor $T_2$ in series with $L_2C_2$ in the parallel LC circuit in the shunt arm of the equalizer. The thermistors may have resistance values that do not appreciably upset the constant resistance properties of the equalizer as seen by the line, while still providing, by their resistance variations with temperature, a considerable variation in the loss and tilt characteristic of the network.

Figure 8:
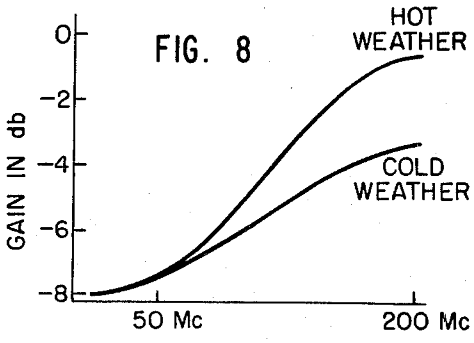
FIG. 8 is a plot showing typical response curves for the thermally-responsive variable equalizer of FIG. 6.

Under conditions of relatively high ambient temperatures, the thermistors $T_1$ and $T_2$ are low in resistance; in view of their series positions they have but little effect on the equalizer characteristic, corresponding to the steeper curve shown in FIG. 8. At low ambient temperatures, the resistance of the thermistors becomes substantially greater. In the case of thermistor $T_1$, the series resistance of the series resonant circuit $C_1L_1T_1$ is increased, while in the parallel circuit of $C_2L_2T_2$, the increase in resistance of thermistor $T_2$ lowers the anti-resonant impedance of that circuit. These changes affect equalizer characteristics mainly at the high frequency end, with the result that the tilt is decreased, as represented by the lower curve marked Cold Weather. Such passive, thermally variable equalizer may therefore be usefully employed in conjunction with a constant-gain amplifier to provide a relatively simple means of compensating for the effects of temperature in transmission lines of appreciable length.

It will be understood that various arrangements and combinations of the disclosed embodiments may be utilized by those skilled in the art to suit particular system requirements. In the case of very long transmission lines, where the accumulated losses under certain extremes of temperature can be very substantial, more than one amplifier may be employed, and in some instances it may be advantageous to utilize several amplifiers and equalizers, disposed at spaced intervals along the sections of transmission line. By reason of the gain compensation by the variable gain amplifiers, and the slope equalization provided by the passive thermally variable equalizer or by the bi-channel system with equalizer plus variable-gain channel, it becomes possible by the present invention to provide effective and reliable transmission systems wherein the over-all gain and gain/frequency relation may automatically be maintained within close limits, undisturbed by even marked variations in temperature from day to day and from season to season.

I claim as my invention:

1. A high frequency transmission system having, in combination with a transmission line exposed to substantial variations in ambient temperature and exhibiting substantial variations in transmission characteristics as a result of such temperature variations, means for compensating for the effects of temperature changes on the transmission line characteristics comprising a variable gain amplifier connected in cascade with said line, said amplifier having a grid-to-cathode circuit, and means in control of the gain of said amplifier, said means including a temperature-sensitive resistance element exposed to the same general temperature conditions as the transmission line and having a normal operating temperature substantially the same as that of the line, the temperature sensitive resistance means comprising a thermistor connected to the grid-to-cathode circuit of the amplifier to control the operating bias of the amplifier to increase the gain with increase in ambient temperature.

2. A high frequency transmission system having, in combination with a transmission line exposed to substantial variations in ambient temperature and exhibiting substantial variations in transmission characteristics as a result of such temperature variations, means for compensating for the effects of temperature changes on the transmission line characteristics comprising a variable gain amplifier connected in cascade with said line, said amplifier having a grid-to-cathode circuit and a bias supply circuit connected thereto, and means in control of the gain of said amplifier, said means including a temperature-sensitive resistance element exposed to the same general temperature conditions as the transmission line and having a normal operating temperature substantially the same as that of the line, the temperature sensitive resistance means comprising a thermistor connected to said bias circuit to control the operating bias of the amplifier to increase the gain with increase in ambient temperature said thermistor being disposed in proximity to a portion of the transmission line and responsive exclusively to the ambient temperature in the vicinity of the line.

3. A high frequency transmission system having, in combination with a transmission line exposed to substantial variations in ambient temperature and exhibiting substantial variations in transmission characteristics as a result of such temperature variations, means for compensating for the effects of temperature changes on the transmission line characteristics comprising a variable gain amplifier connected in cascade with said line, said amplifier having a grid-to-cathode circuit and means in control of the gain of said amplifier, said means including a temperature-sensitive resistance element, the amplifier having a bias supply circuit connected to said grid-to-cathod circuit and comprising fixed resistors and said temperature-sensitive resistance element connected in voltage-dividing relation to form a variable-ratio voltage divider responsive to variations in temperature of the temperature sensitive element, said temperature-sensitive element being disposed in proximity to a portion of the transmission line and temperature-responsive solely to the ambient temperature in the vicinity of the line to decrease the amplifier bias upon an increase in ambient temperature in the vicinity of the transmission line and thereby increase the amplifier gain.

References Cited by the Examiner

UNITED STATES PATENTS 2,867,774 1/59 Bell ________________ 330—143

FOREIGN PATENTS 664,644 1/52 Great Britain.

OTHER REFERENCES

"Regulating Amplifier Corrects Slope and Level," Electronics, July 1956, pages 168–170.

HERMAN KARL SAALBACH, *Primary Examiner.*

BENNETT G. MILLER, ROBERT H. ROSE, *Examiners.*